May 24, 1960  TAKESHI GOSHIMA  2,937,582
PHOTOGRAPHIC CAMERA WITH BUILT-IN EXPOSURE METER
Filed Feb. 5, 1958  2 Sheets-Sheet 1

INVENTOR.
TAKESHI GOSHIMA
BY
ATTORNEY

May 24, 1960  TAKESHI GOSHIMA  2,937,582
PHOTOGRAPHIC CAMERA WITH BUILT-IN EXPOSURE METER
Filed Feb. 5, 1958  2 Sheets-Sheet 2

INVENTOR.
TAKESHI GOSHIMA
BY
ATTORNEY

United States Patent Office 2,937,582
Patented May 24, 1960

2,937,582

PHOTOGRAPHIC CAMERA WITH BUILT-IN EXPOSURE METER

Takeshi Goshima, Tokyo, Japan, assignor to Canon Camera Company, Inc., Tokyo, Japan, a corporation of Japan Filed Feb. 5, 1958, Ser. No. 713,345

5 Claims. (Cl. 95—10)

This invention relates to photographic cameras, and more particularly, to photographic cameras with built-in exposure meters.

Various photographic cameras with built-in exposure meters are prior known and are on the market. Systems of measuring the amount of light passing through lenses and diaphragms are also known. However, light transmitted by parts other than the essential part of the exposure aperture, is also contained in the amount of light passing through a lens and a diaphragm, and will cause errors in exposure. Further, as partial illumination of the exposure aperture can not be measured, there will be inconvenience especially in color photography. In the type wherein the exposure meter must be read with the eye away from the view finder, the position of the pointer will vary while the camera is moved from the view sighting to the meter reading position, and therefore a correct indication can not be read.

One of the objects of the present invention is to enable more accurate exposure measurement than by any photographic camera of this type so far provided.

Another object of the present invention is to provide a simple construction for an exposure meter built into a camera enabling accurate exposure measurement.

Figure 1:
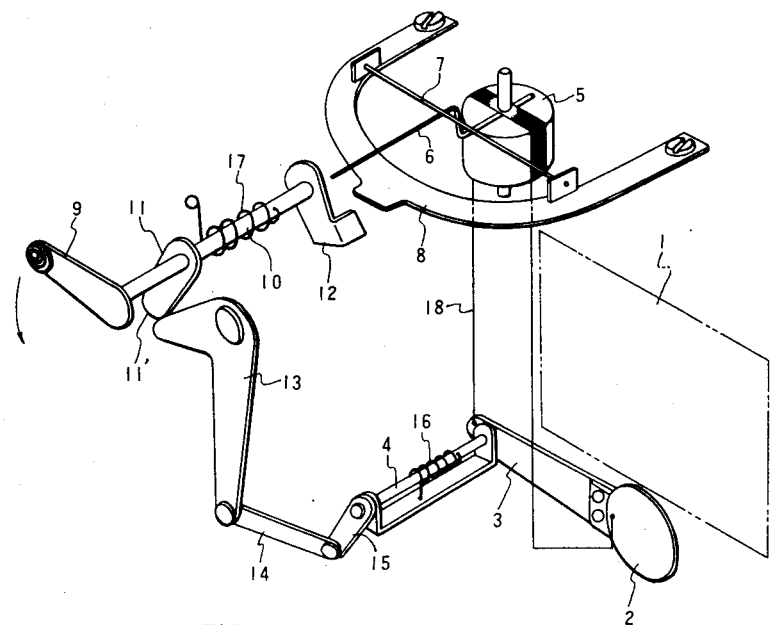
Figure 2:
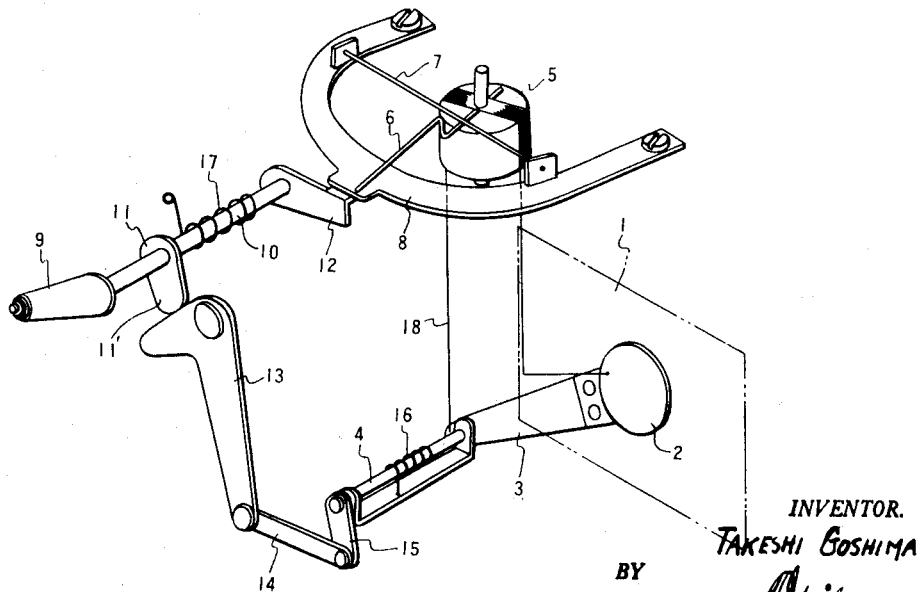
Figure 3:
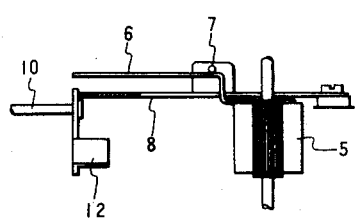
Figure 4:
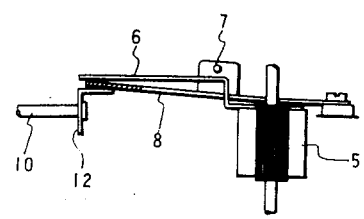
Figure 5:
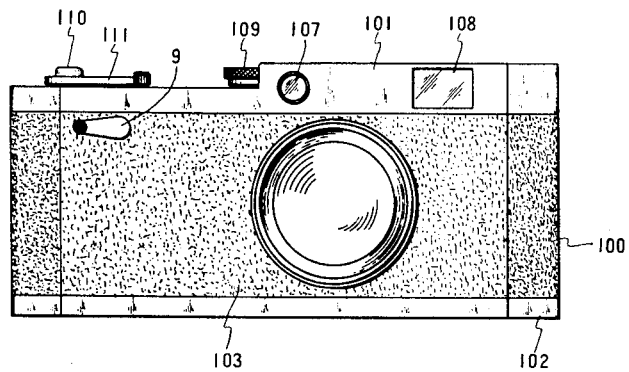
Figure 6:
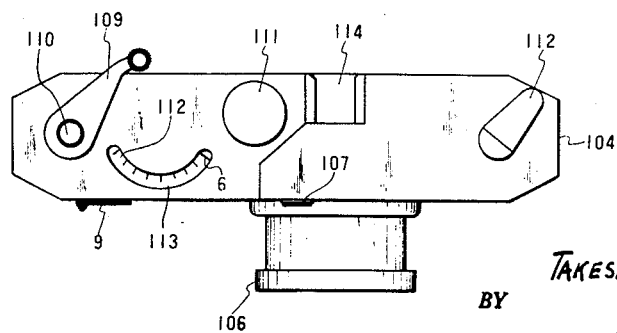

A clear concept of the scope and purpose of this invention will be obtained from the following description of an illustrative embodiment of my invention taken in connection with the appended drawing, in which:

Fig. 1 is a perspective schematized view showing the position of the parts of the invention when the photo cell is in the position withdrawn from the exposure aperture, that is, the photoelectric cell of the exposure meter is out of the light path;

Fig. 2 the same as Figure 1 with the photocell positioned substantially at, and concentrically with, the exposure aperture to measure the light through the camera objective;

Figs. 3 and 4 partial sectional views showing the galvanometer pointer in the cramped and released positions of Figs. 1 and 2, respectively;

Fig. 5 is an elevational view of a photographic camera with a built-in exposure meter according to the present invention; and Fig. 6 is a plan, top view thereof showing the position of the exposure meter relative to other mechanisms built into the camera.

Referring to the drawing, as is well known, housing 100 of a photographic camera comprises top cover 101, bottom cover 102, front wall 103, rear and side walls 104, the top cover 101 being provided with range finder window 107, view finder window 108, film winding lever 109, shutter release button 110 coaxial with the film winding lever, shutter speed dial 111, accessory clip 114, and film rewinding crank 112, while the front wall 103 is fitted with an objective 106.

The exposure meter according to the present invention is of the construction illustrated in Figs. 1 to 4. Its pointer 6, as seen in Fig. 6, is observable through an arcuate aperture 113 so that the amount of exposure may be read from the graduations of scale 112. The lever 9, for cramping from, and releasing for, movement pointer 6 of the exposure meter, is located on the upper left portion of front wall 103, and normally positions an elastic wire 7 against the pointer 6 to cramp, that is restrain, it from movement by the friction produced therebetween as the result of the force pressing the wire against the pointer, as below shown in detail.

The details of the exposure meter according to the present invention are best shown in Figures 1 through 4. The photoelectric cell 2, supported at the free end of pivotable arm 3 disposed axially as close as possible vertically to the exposure aperture 1, may be swung into the exposure aperture to the exact center thereof, and away therefrom to outside the exposure aperture. The area of its light sensitive surface is made so small that the exposure meter measures only the light value of the important portion of the subject to be photographed. Photo cell supporting arm 3 is integral with a horizontal shaft 4 rotatably supported by a bearing bracket affixed to the camera housing. Galvanometer coil 5 is connected with the photo cell 2 through lead wires 18. A thin, elastic wire 7, of rubber, metal or the like, is affixed at its ends to the legs of U-shaped spring 8, normally biased downwardly, so that wire 7 is stretched across the open portion between the legs of the U-spring so as to bear on and cramp pointer 6, hindering movement thereof. Operating handle 9, disposed outside the camera body, is swingably supported on shaft 10 within the camera housing.

In Figures 1 and 3, the photo cell 2 is positioned outside the exposure aperture 1, that is, cell 2 receives no light from the objective and the pointer 6 is restrained and cramped from movement by wire 7. When the operating handle 9 is manually rotated for measurement, shaft 10, cam 11 and lever 12 will rotate with it as a unit; first the photo cell 2 will appear in the center of the exposure aperture, then lever 12 pushes resilient plate 8 upwardly and releases the pointer 6, as shown in Figs. 2 and 4, and an accurate measurement of the light from the subject to be photographed obtained. When operating handle 9 is released, cam 11 and lever 12 will restore to their pre-operated position due to return spring 17, during which restoration first the pointer 6 will be cramped in its indicating position, and then the photo cell will retreat from the exposure aperture. Therefore, even if the camera is moved relative to the object, the previously measured exposure value can be correctly read.

At the time of starting the measurement, the photo cell 2 appears in the exposure aperture 1 and then the cramped pointer 6 is released. At the time of completing the measurement, on the contrary, first the pointer 6 is cramped and then the photo cell 2 returns to its withdrawn position. For such purpose, for example, the shape of the free end 11′ of lever cam 11 is circular and concentric with shaft 10. The circular periphery 11′ acts on lever 13 to maintain the photo cell within the central region of the exposure aperture and thereafter the lever 12 may push up or release the resilient plate 8 thereby releasing, respectively, engaging and cramping the pointer 6.

According to the present invention, the photo cell, so small as to be but a fractional portion of the area of the exposure aperture, is so positioned, when making a measurement, as to appear substantially in the central region of the exposure aperture and therefore, by sighting the center of the view finder on any desired part of the subject to be photographed, the partial illumination of the specific part can be measured. Therefore, the measurement of the luminance, or the luminance ratio of any part of the most important portion of the subject, is readily obtained by the device of the present invention. Thus, the invention is particularly advantageous in color photography. Further, since the operation of inserting the photo cell into and withdrawing it from the exposure aperture, and the operations of cramping and releasing the pointer of the galvanometer, are related to the same handle in such manner that, first, the photo cell is swung to the central region of the exposure aperture and thereafter the pointer is released, the pointer now swinging to make the light measurement and then cramped in such measuring position, and only then is the photo cell withdrawn from within the exposure aperture, the present invention has the important feature that, notwithstanding movement of the camera thereafter, the brightness of the subject, that is, the luminance of the main subject to be photographed, is correctly measured and can be accurately read.

What I claim is:

1. A built-in exposure meter for photographic cameras comprising a photocell of relatively small dimensions as compared to the corresponding dimensions of the exposure aperture defined in the camera, a galvanometer having a pointer and electrically connected to the photocell, means for selectively releasing and blocking movement of the pointer and spring biased normally to block movement of the pointer, means for moving the photocell into alignment with the center of the exposure aperture and the camera objective and to a position out of alignment therewith and spring biased normally to position the cell out of such alignment, and manually actuatable, self-restoring, means operable from outside the camera body to actuate both the selective means to release the pointer and the moving means to position the cell in alignment with the central region of the exposure aperture.

2. The built-in exposure meter according to claim 1 in which the means for selectively blocking and releasing movement of the pointer comprises a U-shaped spring positioned about the galvanometer, the U-shaped spring being supported at its free ends on the camera housing and preformed downwardly at its base portion straddling the pointer, and a thin elastic wire spanned tautly across the legs of the U-spring at its base region frictionally engaging the pointer in the normal position of the U-spring, and the manually actuatable means includes a rotatable arm normally spaced from the base of the U-spring and engaging the base on rotary motion to deflect it and disengage the wire from the pointer.

3. The built-in exposure meter according to claim 1 in which the means for moving the photocell comprises a rotatable horizontal shaft, an arm integral with the horizontal shaft, the photocell being supported at the free end of the arm, a helical spring about the shaft and biasing the shaft so that the arm positions the cell out of alignment with the exposure aperture and camera objective, a pivoted angle lever, and linkage interconnecting the shaft with a first arm of the angle lever, and the manually actuatable means includes a rotatable cam engaging the second arm of the angle lever and on manual rotation in a predetermined direction to deflect the angle lever to rotate the horizontal shaft against the bias of the helical spring to position the cell in alignment with the central region of the exposure aperture.

4. The built-in exposure meter according to claim 1 in which the manually actuatable means includes a horizontal rotatable shaft extending through the camera housing at one end, a first lever integral with the one end shaft region external to the camera housing, a cam integral with the shaft within the housing, a second lever integral with the shaft within the housing, and a helical spring about the shaft within the housing biasing the first lever in one rotary direction and restoring the shaft to its pre-operated position after a manual deflection of the first lever in the opposite rotary direction, the cam on rotation of the shaft actuating the cell moving means and the second lever on rotation of the shaft actuating the pointer releasing and blocking means.

5. A built-in exposure meter for photographic cameras comprising a photocell of small dimensions relative to the corresponding dimensions of the exposure aperture of the camera, a galvanometer having a pointer and electrically connected to the photocell, a window through the camera body for reading the position of the pointer, a U-shaped preformed spring supported in the camera body at the free ends of its legs about the galvanometer, an elastic wire tautly spanning the legs of the U-spring of which wire the ends are attached to the legs and an intermediate portion bears on the pointer frictionally to prevent movement thereof in the normal position of the U-spring, a first rotatable shaft extending at one end region through the camera housing, a first lever integrally on the extending shaft portion, a second lever integrally on the shaft within the housing, the base region of the U-spring extending into the rotary path of the free end of the second lever which on rotation of the first shaft deflects the base region of the U-spring sufficiently to remove the wire from engagement with the pointer, a first helical spring about the first shaft to bias the shaft to the rotated position at which the free end of the second lever is disengaged from the base region of the U-spring, a second rotatable shaft parallel to and spaced from the first shaft, an integral arm on the second shaft closely adjacent to the plane of the exposure aperture of the camera, the free end of the integral arm supporting the photocell, a second helical spring about the second shaft biasing the shaft so that the cell is positioned out of alignment with the exposure aperture and camera objective, a pivoted angle lever, a linkage interconnecting the second shaft with a first arm of the angle lever, and a cam on the first shaft engaging the other arm of the angle lever so that on manual rotary movement of the first lever on the first shaft in the rotary direction opposing the bias of the first helical spring the first shaft is rotated sufficiently to engage the second lever to deflect the U-spring to remove the wire from engagement with the pointer and the cam deflects the angle lever to rotate the second shaft against the bias of the second helical spring sufficiently to position the photocell in alignment with the central region of the exposure aperture, and on release of the first lever the first and second helical springs and the U-spring restore to their pre-operated position the first and second shafts, the levers, the arm, the linkage and the angle lever, respectively, and the wire re-engages the pointer to maintain the pointer in the position to which it deflected while released.

References Cited in the file of this patent

UNITED STATES PATENTS

| | | |
|---|---|---|
| 2,184,016 | Mihalyi | Dec. 19, 1939 |
| 2,188,820 | Riszdorfer | Jan. 30, 1940 |
| 2,194,031 | Riszdorfer | Mar. 19, 1940 |
| 2,206,626 | Blechner | July 2, 1940 |
| 2,325,463 | Axler | July 27, 1943 |
| 2,784,654 | Meyer | Mar. 12, 1957 |